C. E. LARSON.
ADJUSTABLE MECHANICAL ELBOW.
APPLICATION FILED NOV. 17, 1916.
1,218,672.  Patented Mar. 13, 1917.
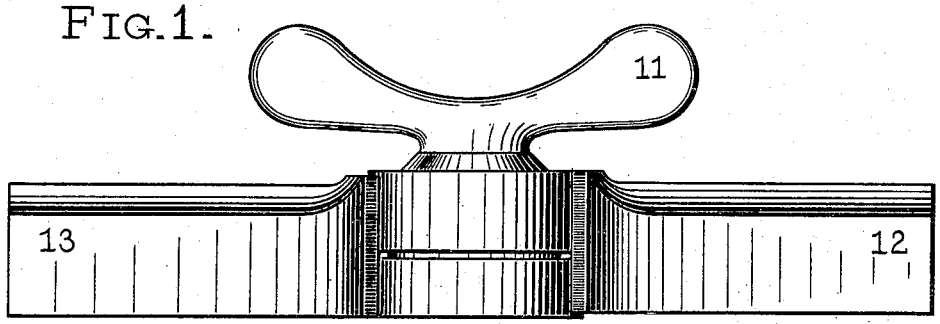
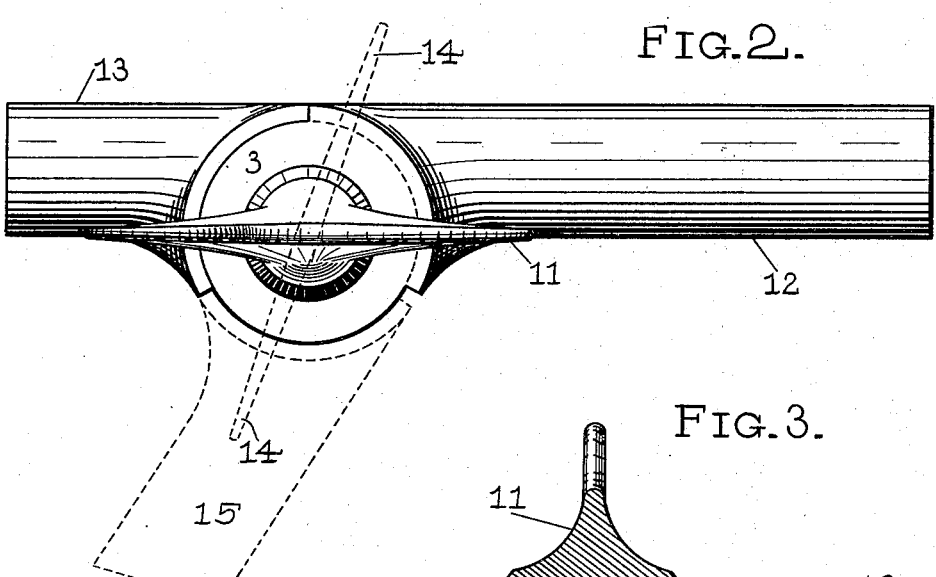
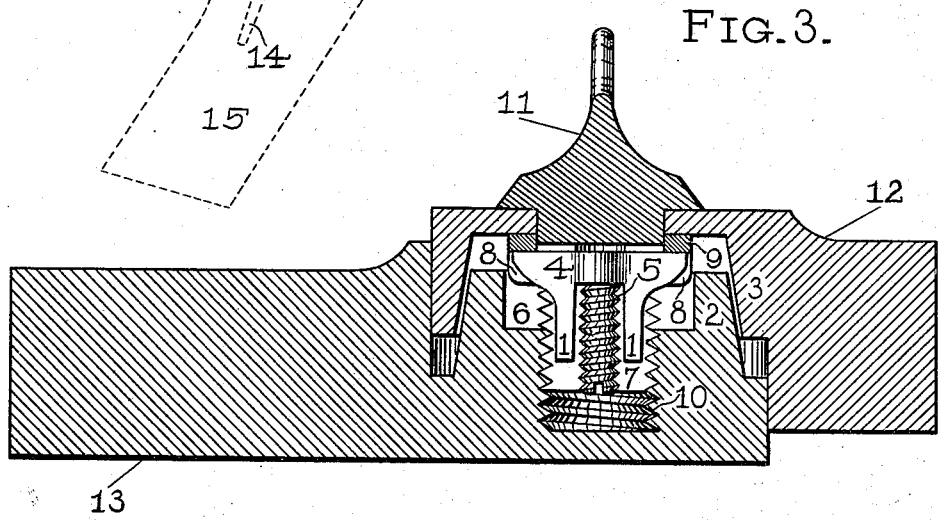
WITNESSES:  Carl Erick Larson INVENTOR.
BY
ATTORNEY

UNITED STATES PATENT OFFICE.

CARL ERICK LARSON, OF LONG ISLAND CITY, NEW YORK.

ADJUSTABLE MECHANICAL ELBOW.

1,218,672. Specification of Letters Patent. Patented Mar. 13, 1917.

Application filed November 17, 1916. Serial No. 131,981.

*To all whom it may concern:*

Be it known that I, CARL ERICK LARSON, a citizen of the United States, and residing at 225 Fifth avenue, Long Island city, in the county of Queens and State of New York, have invented certain new and useful Improvements in Adjustable Mechanical Elbows, of which the following is a specification.

This invention relates to adjustable mechanical joints or elbows wherein one member of such a joint has a tapered cup formed in the side at one end which fits over a cone formed in a corresponding position in an adjacent member.

One advantage of this invention is to provide a flexible joint for various uses, capable of complete rigidity at the turn of a wing screw.

Another advantage is to provide an adjustable joint wherein there is no play whatever.

Another advantage is to provide an adjustable joint or elbow which is very durable and strong.

Another advantage is to provide in an adjustable joint a wing screw which is retained by a collar interiorly adjustable by means of a screw.

Other advantages and possibilities will become apparent as the specification proceeds.

With the aforesaid advantages in view, the invention comprises the improvements and combinations of parts hereinafter described in their embodiment, pointed out in the claims and illustrated in the accompanying drawing. In the latter, like numerals apply to the same parts in the different figures.

Figure 1 is a side view of an elbow embodying this invention.

Fig. 2 is a top view of Fig. 1 with indicated changes in relation of parts.

Fig. 3 is a longitudinal vertical cross section of Fig. 1 with wing screw 11 crosswise, and with bridge 4 and screw 5 shown entire.

It is very desirable in many adjustable tools such as calipers, dividers and the like, to have a good joint which is both free from play and very rigid and firm when once set. This applies with equal force to glass wind shields on automobiles, buggy tops, telephone brackets and awnings. Various joints are in use for these purposes, the majority having merely a pair of flat faces engaging each other to provide frictional rigidity. Moreover the various set screws or nuts used in such joints are either not secured at all or else retained by pins or collars which cannot be reset to take up the play in the parts resulting from wear.

In the present invention it is proposed to remedy these defects in two particulars. Referring to the drawing, the joint is shown to primarily consist of stock 12 and stock 13, the latter having a truncated cone 2 cut on the upper side and the former 12 having a tapered cup 3 adapted to sit and frictionally engage cone 2. The set screw 11 has a slot 7 cut through the entire lower portion and a retaining collar 9 about the screw. The collar has a pair of opposite slots 8, 8, and a bridge 4 fitted in said slots through slot 7, the bridge being provided with legs 1, 1, to prevent dislocation. The screw 5 is fitted into the inner end of wing screw 11, retaining by obstruction the bridge 4, which latter similarly retains collar 9. If there is any undue play above collar 9, it is only necessary to screw 5 and it will cause both bridge 4 and collar 9 to take up the play. Similarly, if screw 5 is removed, bridge 4 and collar 9 will drop off and wing screw 11 may be withdrawn from cup 3. The recess 6 is cut in cone 2 as clearance for collar 9.

If Figs. 1 and 2 are taken as starting positions, the wing screw 11 is supposed to be tight and members 12 and 13 rigid. If the screw 11 is turned to the position indicated by 14, 14, the cup 3 and cone 2 will be forcibly lifted apart and a position indicated as 15 may be assumed by member 12, or any intermediate position. When the wing screw 11 is now turned to the right, it will descend in the thread 10 and will bring the tapered inner face of cup 3 in contact with the face of cone 2, resulting in a very high degree of friction, locking the joint.

Having thus fully described my invention, what I claim as new and desire to obtain by Letters Patent is:

1. An adjustable joint comprising a member bearing a truncated cone and a second member bearing a cup fitting said cone, an adjusting screw exteriorly provided with means for its rotation extending through said cup and into a thread in said cone, a collar about said screw within said cup and means for retaining said collar upon said screw comprising a bridge or pin extending diametrically through said screw in a slot or aperture therein and extending at either end into recesses or slots in said collar, and means for retaining said bridge in contact with said collar, substantially as described.

2. An adjustable joint including a pair of members provided with a cone and a corresponding cup respectively, a locking screw extending through said cup and into a thread in said cone, an open slot in said locking screw and a collar about the screw within the cup, a bridge extending through said open slot and across said collar and means to adjust and retain said bridge and collar on the screw comprising an inner screw seated axially in aforesaid screw abutting said bridge with the inner end thereof, substantially as described.

3. An adjustable joint including a pair of members provided at their junction with a truncated cone, and a cup adapted to frictionally engage in rotation, a locking screw extending centrally through said cup and into a threaded socket in said cone, an open slot in the inner end of said screw and a collar about the latter within the cup and a bifurcated bridge provided with a central enlargement extending through said open slot and across said collar to retain the latter, and an adjusting screw fitted into the inner end of aforesaid screw abutting the central enlargement of said bridge and extending between the prongs thereof, there being a clearance recess in said cone to permit rotation of said collar, substantially as described.

Signed at 132 Nassau street, in the borough of Manhattan, in the county of New York, city and State of New York, this 15th day of November, A. D., 1916.

CARL ERICK LARSON.

Witnesses:
OLOF F. FORSSBERG,
HILDA C. E. FORSSBERG.

Copies of this patent may be obtained for five cents each, by addressing the "Commissioner of Patents, Washington, D. C."